United States Patent
Kutzner et al.

(10) Patent No.: US 9,873,417 B2
(45) Date of Patent: Jan. 23, 2018

(54) METHOD FOR CONVEYING A METERED HYDRAULIC VOLUME IN A VEHICLE BRAKING SYSTEM BY MEANS OF AN ELECTRICALLY DRIVEN MOTOR PUMP ASSEMBLY AND VEHICLE BRAKING SYSTEM

(71) Applicant: Continental Teves AG & Co. oHG, Frankfurt (DE)

(72) Inventors: Michael Kutzner, Sulzbach (DE); Alexander Treib, Heddernheim (DE); Hans Schroth, Neuberg (DE); Peter Handke, Frankfurt am Main (DE); Abolfazl Akbari-Namwar, Groβ-Gerau (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 33 days.

(21) Appl. No.: 14/890,962

(22) PCT Filed: May 15, 2014

(86) PCT No.: PCT/EP2014/059956
§ 371 (c)(1),
(2) Date: Nov. 13, 2015

(87) PCT Pub. No.: WO2014/191214
PCT Pub. Date: Dec. 4, 2014

(65) Prior Publication Data
US 2016/0152218 A1 Jun. 2, 2016

(30) Foreign Application Priority Data
May 28, 2013 (DE) .................. 10 2013 209 890

(51) Int. Cl.
*B60T 8/40* (2006.01)
*F04B 49/06* (2006.01)

(52) U.S. Cl.
CPC ............ *B60T 8/4059* (2013.01); *B60T 8/405* (2013.01); *F04B 49/06* (2013.01)

(58) Field of Classification Search
CPC .......... F04B 49/06; F04B 49/20; F04B 49/02; F04B 2203/0201; F04B 2203/0202
(Continued)

(56) References Cited

U.S. PATENT DOCUMENTS 5,295,737 A * 3/1994 Epple ...................... B60T 8/404
303/11
5,743,598 A * 4/1998 Toda ...................... B60T 8/4291
303/11
(Continued)

FOREIGN PATENT DOCUMENTS

DE 19622754 12/1997
DE 10355239 3/2005
(Continued)

OTHER PUBLICATIONS

German Search Report for German Application No. 10 2013 209 890.1 dated Mar. 10, 2014, including partial translation.
(Continued)

*Primary Examiner* — Robert A Siconolfi
*Assistant Examiner* — San Aung
(74) *Attorney, Agent, or Firm* — RatnerPrestia

(57) ABSTRACT

A method for conveying a metered hydraulic volume in a vehicle braking system by an electrically driven motor pump assembly, wherein a mechanical pump of the motor pump assembly is driven by an electric motor of the motor pump assembly. A rising motor voltage ramp is applied to the electric motor, a motor current being detected, and a con-
(Continued)

veying mode of the motor pump assembly starting as soon as a motor torque generated by the motor current exceeds a total of drag torque, breakaway torque and friction torque of the motor pump assembly. The motor current reduces when the conveying mode starts. The method is characterized in that, when a reduction in the motor current is detected after a specified time interval has elapsed, a motor voltage is reduced to a value which ends the conveying mode. The invention further relates to a vehicle braking system.

10 Claims, 2 Drawing Sheets

(58) Field of Classification Search
USPC ............ 303/10, 11, 116.1; 701/70; 417/44.1, 417/44.11, 45, 12
See application file for complete search history.

(56) References Cited

U.S. PATENT DOCUMENTS

| | | | | |
|---|---|---|---|---|
| 5,927,832 | A * | 7/1999 | Fulks | B60T 8/4059 303/10 |
| 6,188,947 | B1 * | 2/2001 | Zhan | B60T 8/4059 303/11 |
| 8,527,176 | B2 | 9/2013 | Zimmermann | |
| 8,562,304 | B2 | 10/2013 | Barthel | |
| 2008/0224533 | A1 * | 9/2008 | Nakada | B60T 8/4059 303/10 |
| 2011/0033322 | A1 * | 2/2011 | Barthel | B60T 8/4059 417/410.1 |
| 2011/0129356 | A1 * | 6/2011 | Kobayashi | F04C 2/102 417/44.1 |
| 2012/0063922 | A1 * | 3/2012 | Sano | F16H 61/0206 417/44.1 |

FOREIGN PATENT DOCUMENTS

| | | |
|---|---|---|
| DE | 102008018818 | 10/2009 |
| DE | 102009006891 | 8/2010 |
| DE | 102010039818 | 3/2012 |

OTHER PUBLICATIONS

International Search Report for International Application No. PCT/EP2014/059956 dated Sep. 24, 2014.

* cited by examiner

METHOD FOR CONVEYING A METERED HYDRAULIC VOLUME IN A VEHICLE BRAKING SYSTEM BY MEANS OF AN ELECTRICALLY DRIVEN MOTOR PUMP ASSEMBLY AND VEHICLE BRAKING SYSTEM

CROSS REFERENCE TO RELATED APPLICATIONS

This application is the U.S. National Phase Application of PCT International Application No. PCT/EP2014/059956, filed May 15, 2014, which claims priority to German Patent Application No. 10 2013 209 890.1, filed May 28, 2013, the contents of such applications being incorporated by reference herein.

FIELD OF THE INVENTION

Method for delivering a metered hydraulic volume in a vehicle braking system by means of an electrically driven motor pump assembly and vehicle braking system The invention relates to a method for delivering a metered hydraulic volume in a vehicle braking system by means of an electrically driven motor pump assembly and to a vehicle braking system.

BACKGROUND OF THE INVENTION

The braking-related comfort and safety systems of motor vehicles, such as, for example, antilock braking systems, driving stability control systems, distance control systems, or rollover prevention systems, are controlled with increasing sensitivity in response to continuously increasing customer requirements. As a prerequisite for correspondingly sensitive control, however, it must also be possible to control the pump motor of the hydraulic braking system with corresponding precision. A particularly sensitive control is usually achieved by means of pulse-width modulated current signals, wherein the current signals are preferably modulated with a frequency of up to 18 kHz. Likewise, it is also possible, however, to modulate the current signals with frequencies greater than 18 kHz. In general, the greater the frequency of the modulation, the greater the sensitivity with which the pump motor is operated. It is usually also necessary that the particular angular position of the motor or of the pump be known as accurately as possible.

In this context, DE 10 2009 006 891 A1, which is incorporated by reference discloses an electric motor for a hydraulic pump in a braking control system. The electric motor consists of a rotor, which is connected to a motor shaft, and a stator having a plurality of brushes, wherein the rotor provided with turns comprises a commutator having a plurality of commutator bars. In order to permit precise detection of the angle-of-rotation position of the motor shaft, one of the commutator bars is lengthened compared to the remaining commutator bars. In addition, one of the brushes has an axial offset in order to contact the lengthened commutator bar. A signal, which is characteristic of the angle-of-rotation position, can therefore be sensed via the offset brush. Since the actual rotational speed of the motor can therefore be detected independently of the torque to be applied, the speed can always be corrected to the desired setpoint value via the duty factor of the pulse-width modulated control.

DE 10 2008 018 818 A1, which is incorporated by reference describes an electric motor control method having load torque adaptation. In this case, an electric motor is controlled by a current source, which controls in a pulsed manner. Depending on the present load, a certain motor speed results for a certain pump flow or a certain duty factor of the control current. The load during one motor revolution is not constant, however, since this is an angle-dependent load, namely the hydraulic pump of a vehicle braking system. A ripple signal is read out from the voltage potential present at the motor during one revolution and is evaluated for periodicity. It is therefore possible to set a constant rotational speed in the case of periodically occurring events by means of an angular-position dependent adaptation of the duty factor of the control pulses, which contributes to noise reduction and therefore increases driving comfort.

SUMMARY OF THE INVENTION

In the methods and devices known from the prior art, however, in order to set small and minimal braking pressures or to deliver relatively small hydraulic volumes of the pump motor, it is disadvantageous that the pump motor is controlled only for a short time period, although at full load. The high inrush currents associated therewith induce current and voltage fluctuations in the entire vehicle electrical system, which can result in disturbances of the other consumers of the vehicle electrical system or requires a correspondingly reliable and, therefore, complex design of the other consumers. In addition, an angular position sensor is often required in order to determine the present angular position of the motor or of the pump.

The problem addressed by the invention is therefore that of providing a method which overcomes the aforementioned disadvantages.

This problem is solved according to an aspect of the invention by the method for delivering a metered hydraulic volume in a vehicle braking system by means of an electrically driven motor pump.

An aspect of the invention relates to a method for delivering a metered hydraulic volume in a vehicle braking system by means of an electrically driven motor pump assembly, in which a mechanical pump of the motor pump assembly is driven by means of an electric motor of the motor pump assembly, wherein the electric motor is acted upon by a rising motor voltage ramp, wherein a motor current is detected, and wherein a delivery mode of the motor pump assembly starts as soon as a motor torque generated by the motor current exceeds a sum of drag torque, breakaway torque, and friction torque of the motor pump assembly, and wherein the motor current reduces when the delivery mode starts. The method is distinguished by a motor current being reduced to a value which terminates the delivery mode when a reduction in the motor current is detected after a specified time interval has elapsed.

This results in the advantage that the motor is not acted upon immediately with the full motor current, since the motor current follows the relatively slowly rising motor voltage ramp up to the start-up of the motor. Therefore, an excessive overload of the vehicle electrical system and the further consumers connected to the vehicle electrical system caused by the current and voltage fluctuations is avoided. These consumers can therefore also be designed to be relatively simpler and less robust with respect to voltage and current fluctuations, since said voltage and current fluctuations are substantially reduced by means of the method according to an aspect of the invention. The entire design of the electrical vehicle infrastructure can therefore be simplified.

The reduction of the motor current is an effect that necessarily occurs when the delivery mode starts, since the motor torque to be applied when the delivery mode starts reduces by the amount of the breakaway torque. The motor current therefore no longer follows the motor voltage ramp once the delivery mode starts or once a rotation and an electromotive force start.

The motor current is preferably detected by the armature and the brush of the electric motor. If this is a brushless electric motor, the motor current can also be exclusively detected by the armature.

Since the motor voltage is reduced again to a value which does not enable the delivery mode to continue and therefore also terminates the delivery mode, when the reduction in the motor current is detected and, therefore, when the start of the delivery mode is detected after the specified time interval has elapsed, the delivered hydraulic volume can be metered relatively exactly. The reduction in the motor voltage also results in a reduction in the motor current and, as soon as this motor current is too low to maintain the delivery mode, the delivery mode terminates.

In particular, the motor voltage is reduced to the value 0 V. This ensures a rapid and reliable termination of the delivery mode.

The specified time interval can be specified to be either fixed and unchangeable or to be adaptable. The longer the duration of the time interval, the greater the volume of the delivered hydraulic volume.

Preferably, it is provided that an electric control of the motor pump assembly is carried out in a pulse-width modulated manner, in particular with a clock frequency of at least 1 kHz. A pulse-width modulated control is an option for the variable control of an electric consumer which is relatively simple and, in particular, low-cost. The higher the clock frequency of the control, the greater the sensitivity with which it is carried out. Clock frequencies of 1 kHz and higher have proven sufficient for ensuring a quiet and even start of the delivery mode.

In addition, it is preferred that the time interval is infinitesimal. This results in the advantage that the delivery mode is aborted again immediately after it starts, whereby only a very small hydraulic volume is delivered. As a result, in turn, the delivered hydraulic volume can be highly precisely metered.

It is provided that the reduction is detected by observing a gradient of the motor current. This results in the advantage that the reduction can be reliably detected in a simple manner on the basis of the sign of the gradient, also in the case of relatively low motor currents. In this case, the occurrence of a negative gradient signals the reduction in the motor current. In this case, it is provided, in particular, that the negative gradient is formed and observed with an electronic circuit arrangement designed for this. This circuit arrangement can be designed, for example, as a relative current measuring circuit, which is also used, in principle, in a number of known braking control devices for detecting the motor current. In addition, it has proven advantageous, however, to provide this relative current measuring circuit with a low-resistance measuring resistor, which can also be designed as conductor path resistance in order to reduce costs. The gradient can also be formed in a hardware-based manner rather than by means of a software algorithm, wherein, in the former case, immediately after the gradient is formed, an interrupt is generated and the gradient is transmitted to a software algorithm designed for this.

In addition, it is provided that the method is carried out only in a single brake circuit of a multicircuit vehicle braking system. This results in the advantage that the occurring vehicle deceleration is reduced or, in the case of a double-circuit vehicle braking system, is substantially halved. The vehicle deceleration can therefore be set with greater sensitivity and can be controlled more exactly.

In particular, it is further provided that an isolating valve and a switchover valve of a brake circuit of the multicircuit vehicle braking system, whose electric motor of the motor pump assembly is not acted upon with the motor voltage ramp, are open. It is therefore ensured that braking pressure is not built up in this brake circuit and, therefore, a vehicle deceleration is not effected. This further improves the sensitive controllability of the vehicle deceleration. In particular in the case of a so-called diagonal division of the brake circuits of a double-circuit vehicle braking system, the further advantage results that the occurrence of alternating torques and, therefore, a transfer of vibrations to the steering can be avoided.

The method according to the invention is preferably distinguished by an angular position of the motor and/or the pump being determined by means of the motor voltage, the motor current, and a certain hydraulic pressure in the vehicle braking system. An energy input into the motor pump assembly can be easily determined via the motor current and the motor voltage when the delivery mode starts. With consideration for the hydraulic pressure prevailing in the vehicle braking system, a change in the angular position of the motor or the pump can therefore be determined, and so, in turn, the present angular position can be determined on the basis of the last known angular position. The advantage therefore results that an angular-position sensor is not required, which helps to reduce the production complexity and costs for the motor pump assembly.

In a further preferred embodiment of the invention, it is provided that the delivered hydraulic volume is determined from the angular position of the motor and/or the pump and the specified time interval. Since a change in the angular position of the motor or the pump is associated with a delivery mode of the motor pump assembly, the delivered hydraulic volume can be determined in a manner that is as simple as it is reliable from the change in angular position, for example, by means of a corresponding characteristic curve, in particular with consideration for the absolute starting angular position and the absolute final angular position.

In addition, it is advantageous that the method is successively repeated until a specified hydraulic setpoint pressure is reached. The required setpoint pressure can therefore be successively built up in a relatively sensitive manner in a plurality of consecutive steps, since the delivered hydraulic volume can be metered in a sensitive manner in each case. This is advantageous, in particular, for all vehicle systems which require only slight changes in pressure, but which are designed to be comfort-oriented. One example thereof is a distance and speed control system.

An aspect of the invention further relates to a vehicle braking system, comprising at least one electronic control unit and at least one hydraulic brake circuit having an electric motor pump assembly, wherein an electric motor of the motor pump assembly drives a mechanical pump of the motor pump assembly, wherein the control unit acts upon an electric motor of the motor pump assembly with a rising motor voltage ramp, wherein the control unit detects a motor current, and wherein a delivery mode of the motor pump assembly starts as soon as a motor torque generated by the motor current exceeds a sum of drag torque, breakaway torque, and friction torque of the motor pump assembly, and wherein the motor current reduces when the delivery mode starts. The vehicle braking system is distinguished by the control unit reducing a motor voltage to a value which terminates the delivery mode when a reduction in the motor current is detected after a specified time interval has elapsed. The vehicle braking system according to the invention therefore has all necessary means for carrying out the method according to the invention. Given that the vehicle braking system according to an aspect of the invention reduces the motor voltage to a value which terminates the delivery mode of the motor pump assembly when a reduction in the motor current is detected, the above-described advantages result.

The vehicle braking system preferably carries out the method according to an aspect of the invention.

Further preferred embodiments will become apparent from the dependent claims and the subsequent description of an exemplary embodiment with reference to figures.

DETAILED DESCRIPTION OF THE PREFERRED EMBODIMENTS

Figure 1A:
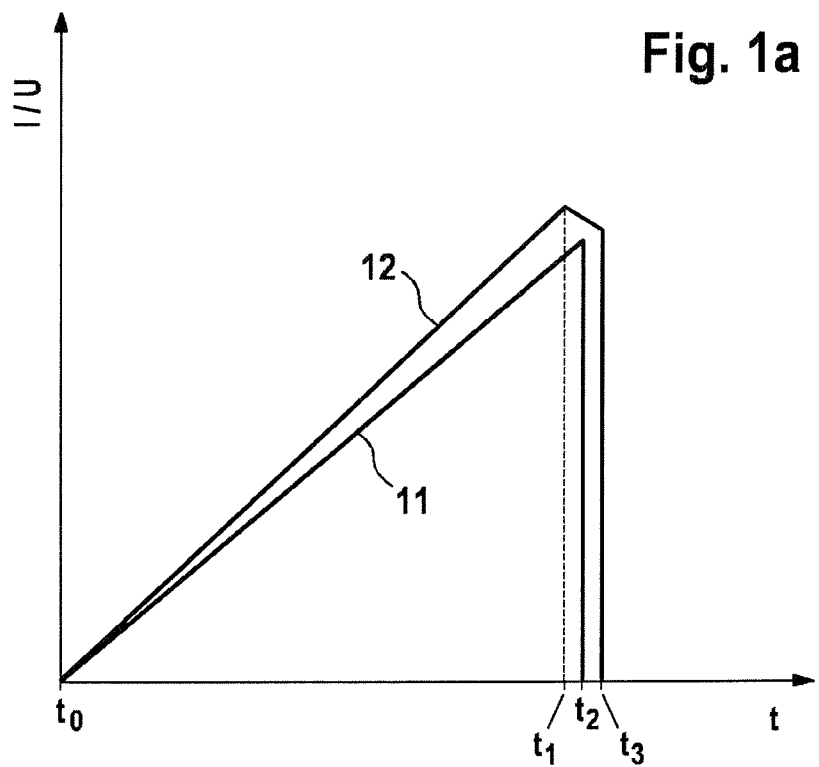
FIGS. 1a-1b show the course of the motor voltage and the motor current during the motor voltage ramp up to the start and termination of the delivery mode.
Figure 1B:
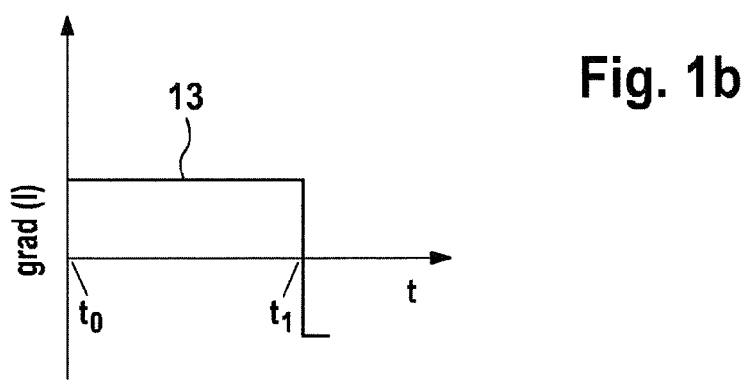

FIG. 1a shows current I and voltage U of the motor over time t, wherein curve 11 describes the motor voltage and curve 12 describes the motor current. In this case, the movement along the motor voltage ramp begins at the time $t_0$ and is depicted by the rise of curve 11 in the interval from $t_0$ to $t_2$. The motor current also rises in curve 12, in proportion to the rise of curve 11, although only in the interval from $t_0$ to $t_1$. At the time $t_1$, the generated motor torque exceeds the sum of drag torque, breakaway torque, and friction torque of the motor pump assembly, whereby the delivery mode of the motor pump assembly starts. This, in turn, results in a breakdown of the motor current at the time $t_1$. Since a gradient of the motor current is formed and observed, the breakdown or the reduction in the motor current is detected on the basis of the change in the sign of the gradient, which is now negative. Immediately after the reduction in the motor current has been detected, i.e., after an infinitesimal time interval has elapsed, the motor voltage is reduced at the time $t_2$ to the value 0 V, in order to terminate the delivery mode. The motor current cannot immediately follow this sudden reduction in the motor voltage and does not reduce to the value 0 A until the time $t_3$. Curve 13, which depicts the gradient of the motor current, is shown in FIG. 1b. As is evident, the gradient has a constant positive value for as long as the motor current constantly rises. At the time $t_1$, however, when the motor current breaks down, the gradient changes its sign and is now negative. This is how the breakdown or the reduction in the motor current is detected.

Figure 2:
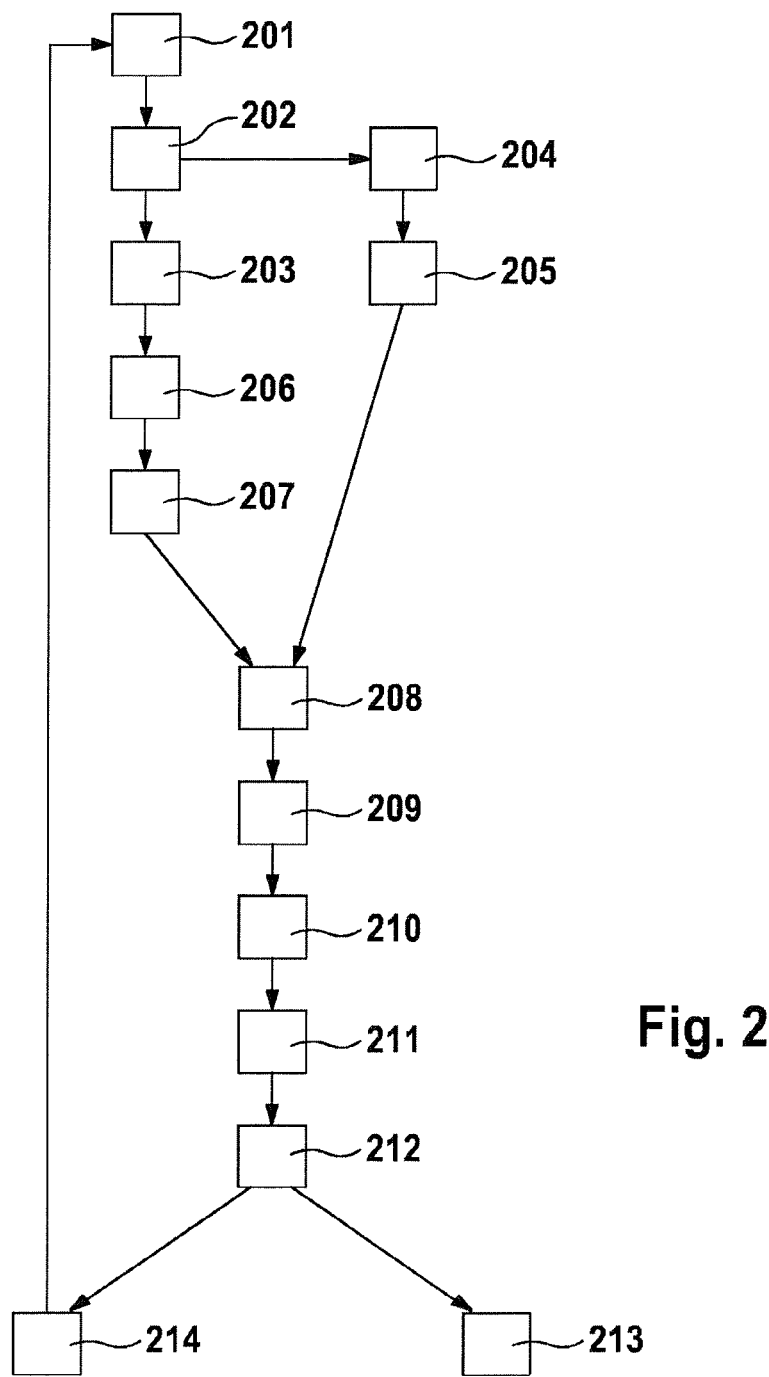
FIG. 2 shows a flow chart of one possible sequence of the method according to the invention.

FIG. 2 shows a flow chart of one possible sequence of the method according to an aspect of the invention. In method step 201, the motor of the motor pump assembly is acted upon with a rising motor voltage ramp. In step 202, the motor current induced by the motor voltage ramp is steadily and continuously detected. In step 203, the increasing motor voltage and the increasing motor current induce an increasing motor torque. In method step 204, the gradient of the motor current is formed and, in step 205, the gradient of the motor current is steadily and continuously observed. The generated motor torque exceeds a sum of drag torque, breakaway torque, and friction torque of the motor pump assembly in method step 206, and so, in step 207, a delivery mode of the motor pump assembly starts. The start of the delivery mode is detected by means of the continuous observation of the gradient of the motor current, which takes place in step 205, whereupon, in step 208, the motor voltage is reduced to the value 0 V. Subsequently, the delivery mode of the motor pump assembly terminates in step 209. In step 210, a change in the angular position of the electric motor or the pump is determined from the motor current, the motor voltage, and the hydraulic pressure in the vehicle braking system and, next, the present absolute angular position is determined from this change in angular position with consideration for the most recent absolute angular position. In the following method step 211, the delivered hydraulic volume is determined, which is carried out with consideration for the starting angular position and the final angular position of the pump or the motor, due to the delivery method of the pump, which is dependent upon angular position. Finally, in step 212, the present pressure in the vehicle braking system is compared with the setpoint pressure to be built up. If the setpoint pressure has been reached, the method terminates in step 213. If the setpoint pressure has not yet been reached, however, the method is carried out again in step 201, via step 214.

The invention claimed is:

1. A method for delivering a metered hydraulic volume in a vehicle braking system by an electrically driven motor pump assembly, in which a mechanical pump of the motor pump assembly is driven by an electric motor of the motor pump assembly, wherein the electric motor is acted upon by a rising motor voltage ramp, wherein a motor current is detected, and wherein a delivery mode of the motor pump assembly starts as soon as a motor torque generated by the motor current exceeds a sum of drag torque, breakaway torque, and friction torque of the motor pump assembly, and wherein the motor current reduces when the delivery mode starts, and wherein a motor current is reduced to a value which terminates the delivery mode immediately after the reduction in the motor current at the start of the delivery mode is detected.

2. The method as claimed in claim 1, wherein an electric control of the motor pump assembly is carried out in a pulse-width modulated manner with a clock frequency of at least 1 kHz.

3. The method as claimed in claim 1, wherein the reduction is detected by observing a gradient of the motor current.

4. The method as claimed in claim 1, wherein the method is carried out only in a single brake circuit of a multicircuit vehicle braking system.

5. The method as claimed in claim 4, wherein
   an isolating valve and a switchover valve of a brake circuit of the multicircuit vehicle braking system, whose electric motor of the motor pump assembly is not acted upon with the motor voltage ramp, are open.

6. The method as claimed in claim 1, wherein the method is successively repeated until a hydraulic setpoint pressure is reached.

7. A vehicle braking system, comprising at least one electronic control unit and at least one hydraulic brake circuit having an electric motor pump assembly, wherein an electric motor of the motor pump assembly drives a mechanical pump of the motor pump assembly, wherein the control unit acts upon an electric motor of the motor pump assembly with a rising motor voltage ramp, wherein the control unit detects a motor current, and wherein a delivery mode of the motor pump assembly starts as soon as a motor torque generated by the motor current exceeds a sum of drag torque, breakaway torque, and friction torque of the motor pump assembly, and wherein the motor current reduces when the delivery mode starts, and wherein the control unit reduces a motor current to a value which terminates the delivery mode when a reduction in the motor current is detected after a specified time interval has elapsed, wherein the vehicle braking system carries out a method as claimed in claim 1.

8. A method for delivering a metered hydraulic volume in a vehicle braking system by an electrically driven motor pump assembly, in which a mechanical pump of the motor pump assembly is driven by an electric motor of the motor pump assembly, wherein the electric motor is acted upon by a rising motor voltage ramp, wherein a motor current is detected, and wherein a delivery mode of the motor pump assembly starts as soon as a motor torque generated by the motor current exceeds a sum of drag torque, breakaway torque, and friction torque of the motor pump assembly, and wherein the motor current reduces when the delivery mode starts, and wherein a motor current is reduced to a value which terminates the delivery mode when a reduction in the motor current is detected after a specified time interval has elapsed, and wherein an angular position of the motor and/or the pump is determined by the motor voltage, the motor current, and a predetermined hydraulic pressure in the vehicle braking system.

9. The method as claimed in claim 8, wherein
the delivered hydraulic volume is determined from the angular position of the motor and/or the pump and the specified time interval.

10. A vehicle braking system, comprising at least one electronic control unit and at least one hydraulic brake circuit having an electric motor pump assembly, wherein an electric motor of the motor pump assembly drives a mechanical pump of the motor pump assembly, wherein the control unit acts upon an electric motor of the motor pump assembly with a rising motor voltage ramp, wherein the control unit detects a motor current, and wherein a delivery mode of the motor pump assembly starts as soon as a motor torque generated by the motor current exceeds a sum of drag torque, breakaway torque, and friction torque of the motor pump assembly, and wherein the motor current reduces when the delivery mode starts, and wherein the control unit reduces a motor current to a value which terminates the delivery mode immediately after the reduction in the motor current at the start of the delivery mode is detected.

* * * * *